US011997442B2

(12) United States Patent
Miller et al.

(10) Patent No.: US 11,997,442 B2
(45) Date of Patent: May 28, 2024

(54) OPEN-EAR HEADPHONE

(71) Applicant: Bose Corporation, Framingham, MA (US)

(72) Inventors: Joel Miller, Westborough, MA (US); Todd Reily, North Reading, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/137,007

(22) Filed: Apr. 20, 2023

(65) Prior Publication Data

US 2023/0254624 A1 Aug. 10, 2023

Related U.S. Application Data

(63) Continuation of application No. 17/474,987, filed on Sep. 14, 2021, now Pat. No. 11,659,313, which is a continuation of application No. 17/306,208, filed on May 3, 2021, now Pat. No. 11,140,469.

(51) Int. Cl.
*H04R 5/027* (2006.01)
*H04R 1/08* (2006.01)
*H04R 1/10* (2006.01)

(52) U.S. Cl.
CPC ............. *H04R 1/1016* (2013.01); *H04R 1/08* (2013.01); *H04R 1/1025* (2013.01); *H04R 5/027* (2013.01)

(58) Field of Classification Search
CPC ...... H04R 1/1016; H04R 1/08; H04R 1/1025; H04R 5/027; H04R 1/1066; H04R 1/1075; H04R 1/345; H04R 1/105
See application file for complete search history.

(56) References Cited

U.S. PATENT DOCUMENTS 8,885,861 B2 * 11/2014 Beck .................... H04R 1/1091 381/328
10,063,958 B2 * 8/2018 Jentz ...................... H04R 1/105
2009/0238398 A1 * 9/2009 Connors ................ H04R 1/105 381/375

* cited by examiner

*Primary Examiner* — Brian Ensey

(57) ABSTRACT

An open-ear headphone with an acoustic module that is configured to be located at least in part in a concha of an outer ear of a user. The acoustic module includes an acoustic transducer, and a sound-emitting opening that is configured to emit sound produced by the acoustic transducer. A battery housing is configured to be located behind the outer ear and contains a battery power source. A compliant connecting portion couples the battery housing to the acoustic module. The connecting position enables displacement of the battery housing relative to the acoustic module.

25 Claims, 15 Drawing Sheets

OPEN-EAR HEADPHONE

CROSS-REFERENCE TO RELATED APPLICATION

This application is a continuation of and claims priority to U.S. patent application Ser. No. 17/474,987, filed on Sep. 14, 2021, which is a continuation of U.S. patent application Ser. No. 17/306,208, filed on May 3, 2021.

BACKGROUND

This disclosure relates to an open-ear headphone that is carried on the ear.

Open-ear headphones typically emit sound at a location close to but not in the ear canal.

SUMMARY

Aspects and examples are directed to an open-ear headphone with an acoustic module that is configured to be located in the cavum conchae of the outer ear of the user. The acoustic module includes an acoustic transducer and a sound-emitting opening that is configured to emit sound produced by the acoustic transducer. A headphone body coupled to the acoustic module has a first portion that is configured to pass over the outer side of the outer ear, and a second portion that is configured to be located behind the outer ear. The sound-emitting opening is configured to be spaced from and proximate the user's ear canal opening. In some examples the acoustic module has a lower portion that is outwardly convex and is configured to sit in a lower concavity of the cavum conchae, to support the open-ear headphone in its use position without the need to clamp to the ear.

All examples and features mentioned below can be combined in any technically possible way.

In one aspect, an open-ear headphone includes an acoustic module configured to be located at least in part in a concha of an outer ear of a user and comprising an acoustic transducer with a sound-emitting opening that is configured to emit sound produced by the acoustic transducer, and a body coupled to the acoustic module and comprising a first portion configured to pass over an outer side of at least one of an anti-helix and a helix and a lobule of the outer ear, and a second portion configured to be located behind the outer ear.

Some examples include one of the above and/or below features, or any combination thereof. In an example the sound-emitting opening is configured to be spaced from and proximate the user's ear canal opening. In an example the acoustic module is configured to be located at least in part in a cavum conchae of the outer ear. In an example the acoustic module comprises a lower portion that is outwardly convex. In an example the outwardly convex lower portion of the acoustic module is configured to sit in a lower concavity of the cavum conchae that is adjacent to an antitragus of the user's ear. In an example at least one of the antihelix, the helix, and a lobule of the ear is configured to be located between the first portion and second portion of the body. In an example the open-ear headphone also includes a pair of microphones in the first portion of the body, wherein the microphones are located in opposed sides of the first portion such that one microphone is configured to be farther from the user's mouth than is the second microphone.

Some examples include one of the above and/or below features, or any combination thereof. In an example the body is generally "L"-shaped. In an example the acoustic module and body together are generally "C"-shaped. In an example a center of gravity of the open-ear headphone is between the acoustic module and the second portion of the body. In an example the center of gravity of the open-ear headphone is configured to be located in the outer ear.

Some examples include one of the above and/or below features, or any combination thereof. In an example the first sound-emitting opening of the acoustic module is configured to be located in a cavum conchae and proximate an ear canal opening of the user's ear. In an example the acoustic module further comprises a second sound-emitting opening that is configured to be farther from the ear canal opening than is the first sound-emitting opening. In an example the acoustic transducer produces sound pressure in front and back acoustic cavities of the acoustic module, and the first sound-emitting opening is fluidly coupled to the front acoustic cavity and the second sound-emitting opening is fluidly coupled to the back acoustic cavity.

Some examples include one of the above and/or below features, or any combination thereof. In an example the second portion of the body comprises a battery housing that is configured to house a battery power source for the open-ear headphone. In an example there is a printed circuit board in the first portion of the body and that is electrically coupled to the battery. In an example there is also a flexible circuit element that electrically couples the printed circuit board to the acoustic transducer.

In another aspect an open-ear headphone includes an acoustic module configured to be located at least in part in a cavum conchae of an outer ear of a user and comprising an acoustic transducer and a sound-emitting opening that is configured to emit sound produced by the acoustic transducer. The acoustic module is configured to be located in the cavum conchae and proximate but not in the ear canal opening of the user's ear. There is a body coupled to the acoustic module and comprising a first portion configured to pass over an outer side of at least one of an anti-helix and a helix and a lobule of the outer ear, and a second portion configured to be located behind the outer ear. At least one of the antihelix, the helix, and a lobule of the ear is configured to be located between the first portion and second portion of the body.

Some examples include one of the above and/or below features, or any combination thereof. In an example the second portion of the body comprises a battery housing that is configured to house a battery power source for the open-ear headphone. In an example the acoustic module comprises a lower portion that is outwardly convex and is configured to sit in a lower concavity of the cavum conchae that is adjacent to an antitragus of the user's ear.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1A:
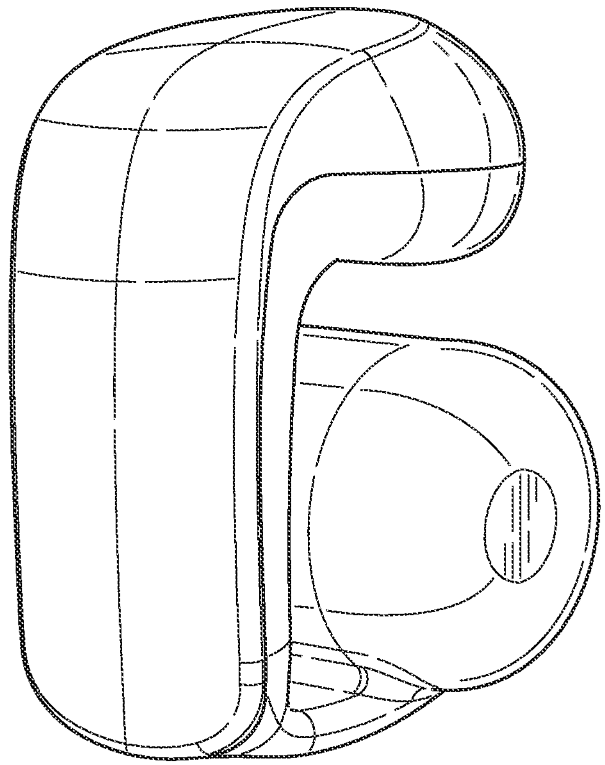
FIGS. 1A-1G are perspective, front, right side, left side, rear, top, and bottom views, respectively, of an open-ear headphone.
Figure 1B:
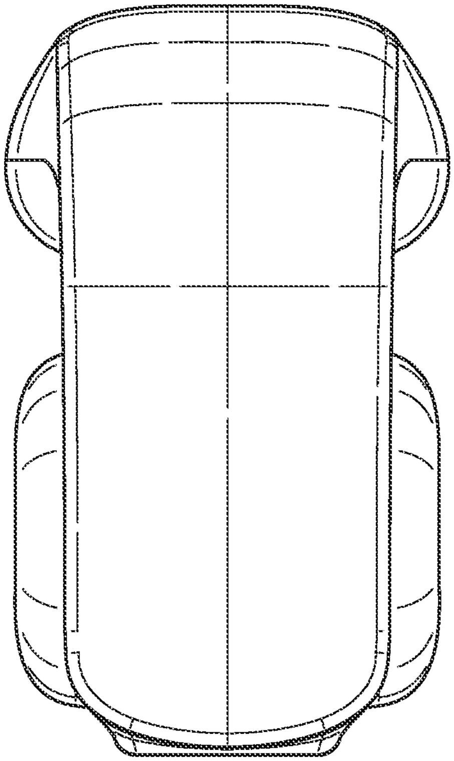
Figure 1C:
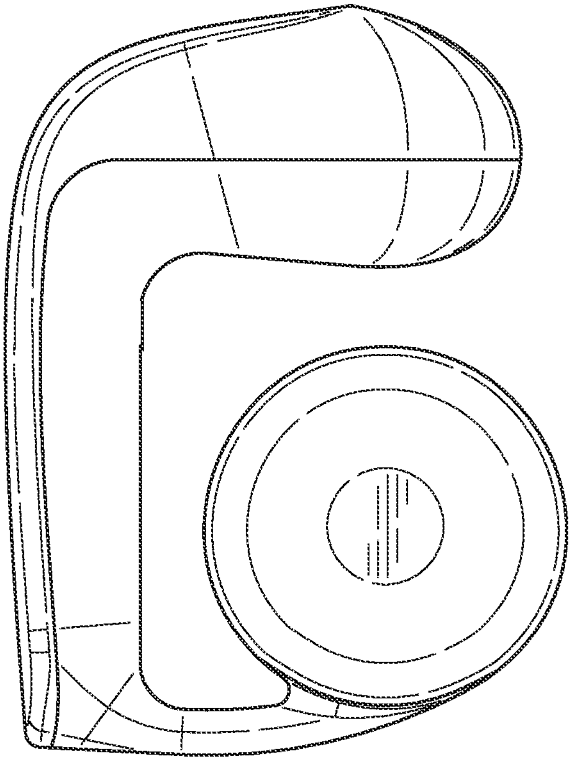
Figure 1D:
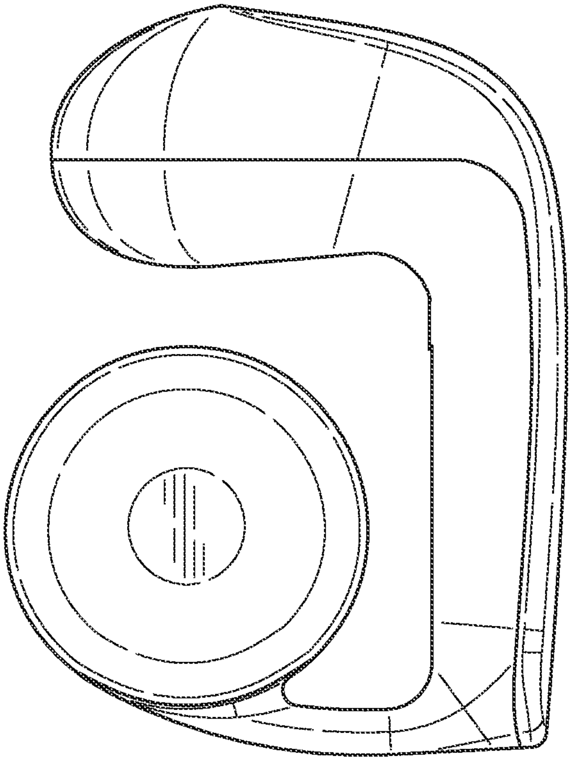
Figure 1E:
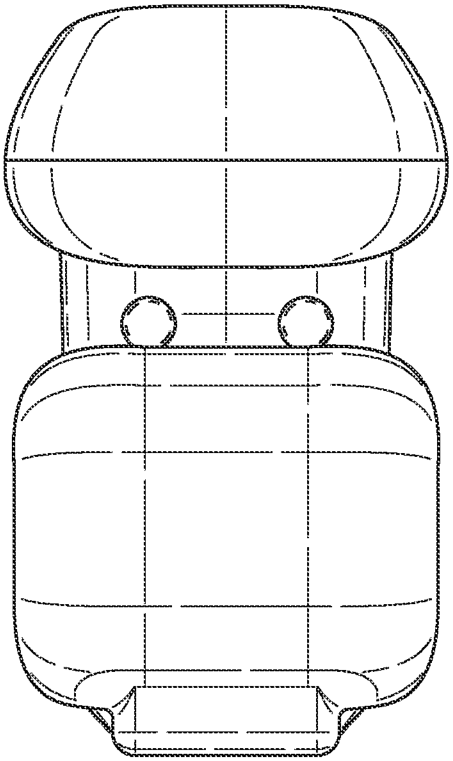
Figure 1F:
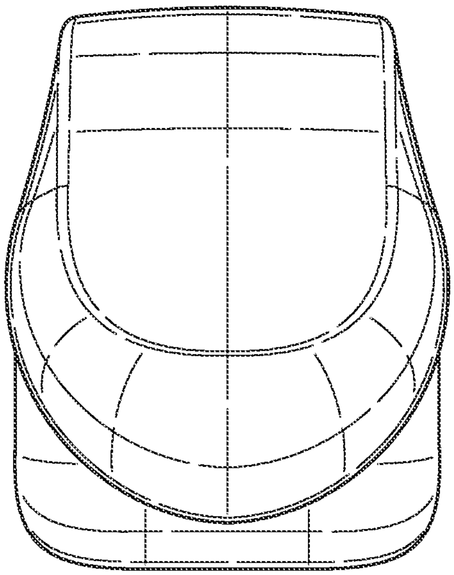
Figure 1G:
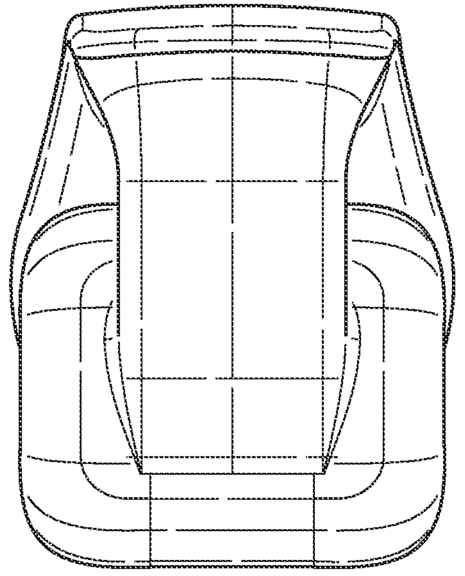
Figure 1H:
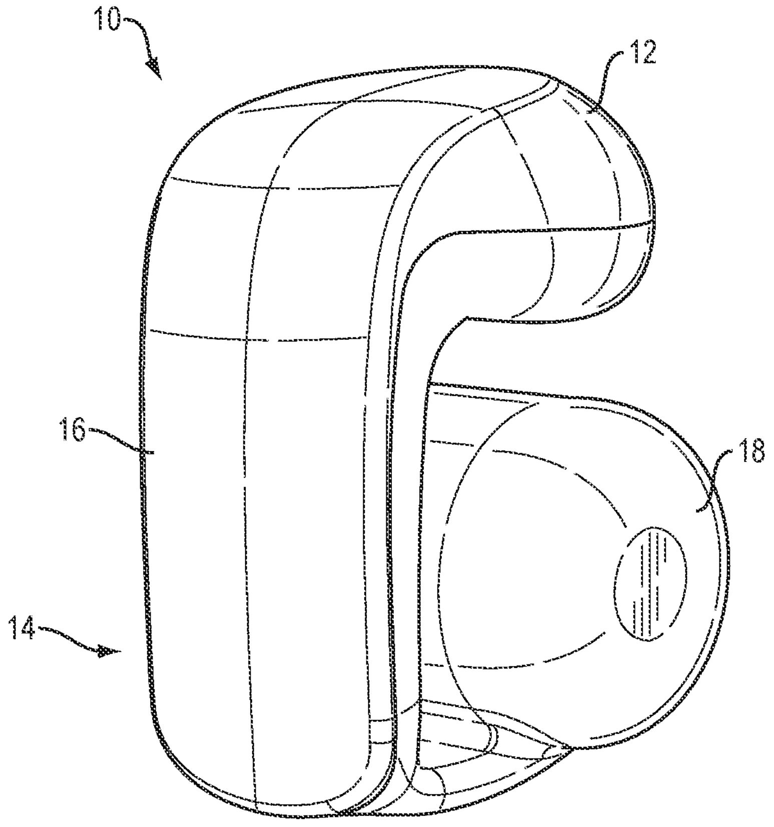
FIGS. 1H and 1I are additional perspective views of the open-ear headphone of FIGS. 1A-1G, but with elements of the open-ear headphone identified.
Figure 1I:
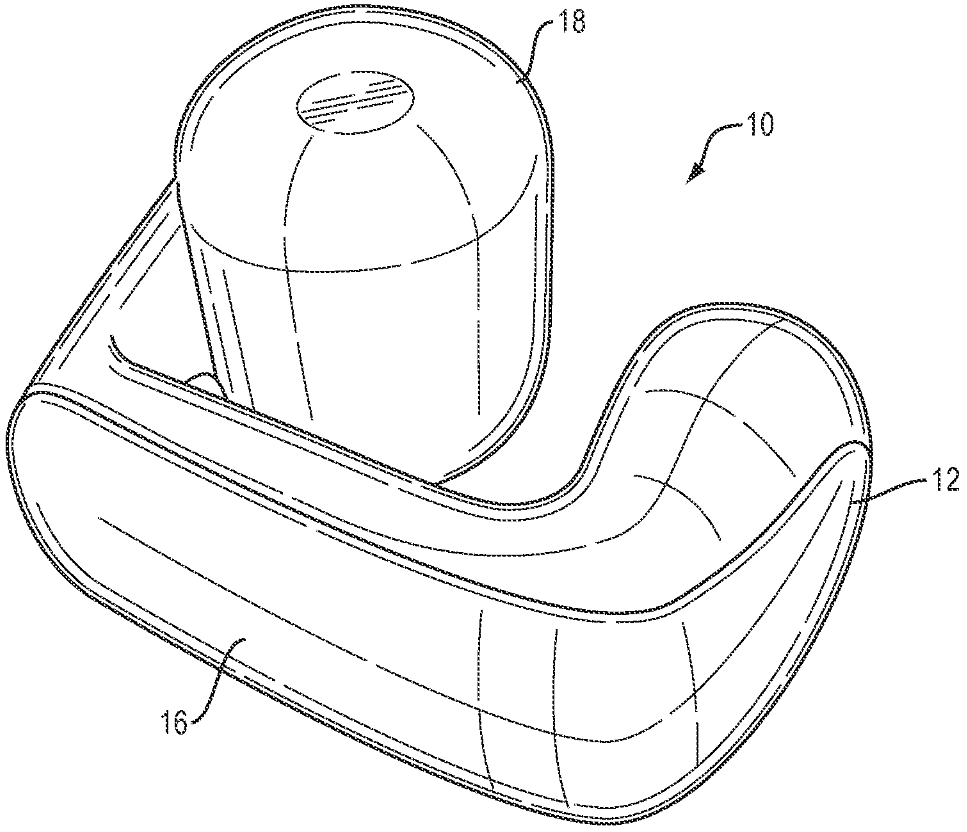

Open-ear headphones that are carried on the ear should provide high-quality sound, be stable on the ear, be comfortable to wear for long periods of time, be unobtrusive, and look stylish. These goals can be difficult to achieve, as in some respects they have been considered mutually exclusive. For example, stability typically translates into clamping on the outer ear, which can be uncomfortable for long-term wear and also may not look stylish. Also, for high-quality sound there must be sound delivery close to but not in the ear canal, meaning that headphone structure needs to overlie the ear and so may be highly visible to others.

The present open-ear headphone is able to meet all of these goals. The acoustic transducer or driver is in an acoustic module that is configured to be located in the cavum conchae of the outer ear, close to the ear canal. The acoustic module has a sound-emitting opening on the side closest to the ear canal, leading to higher quality sound. The acoustic module is shaped to nestle in the lower concavity of the cavum conchae. A body section that carries the acoustic module is shaped to pass over the outer side of the anti-helix/helix/lobule of the ear, and ends in a distal portion that is located behind the outer ear. The center of gravity of the open-ear headphone is between the acoustic module and the distal portion, and is thus in or very close to the anti-helix, helix, or lobule; this leads to greater stability on the ear without the need to clamp on the ear. The open-ear headphone is thus comfortable for long-term wear.

Examples of the headphones described herein are not limited in application to the details of construction and the arrangement of components set forth in the following description or illustrated in the accompanying drawings. The headphones are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the devices herein referred to in the singular may also embrace embodiments including a plurality, and any references in plural to any example, component, element, act, or function herein may also embrace examples including only a singularity. Accordingly, references in the singular or plural form are not intended to limit the presently disclosed devices, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

This disclosure features an open-ear headphone with an acoustic module configured to be located at least in part in a concha of an outer ear of a user and comprising an acoustic transducer and a first sound-emitting opening that is configured to emit sound produced by the acoustic transducer, and a body coupled to the acoustic module and comprising a first portion configured to pass over an outer side of the outer ear, and a second portion configured to be located behind the outer ear. The first sound-emitting opening is configured to be spaced from and proximate the user's ear canal opening, preferably in the cavum conchae and proximate the ear canal opening. In some examples the acoustic module is configured to be located in the cavum conchae. In a specific example the acoustic module has lower portion that is outwardly convex and is configured to sit in a lower concavity of the cavum conchae that is adjacent to the antitragus and lobule of the user's ear.

The open-ear headphone is configured such that when the acoustic module is placed into the cavum conchae of the ear the body passes over at least one of the antihelix, the helix, and the lobule of the ear. In an example the body is generally "L"-shaped and the acoustic module and body together (i.e., the entire open-ear headphone) is generally "C"-shaped. In an example the center of gravity of the open-ear headphone is between the acoustic module and the second portion of the body. The center of gravity can be located in or near the part of the outer ear that is between the acoustic module and the second portion of the body (e.g., the helix or lobule).

In some examples the acoustic module includes a second sound-emitting opening that is configured to be farther from the ear canal opening than is the first sound-emitting opening. The sound-emitting openings can be arranged to accomplish a dipole-like pattern that can result in sound cancelation that reduces spillage of the sound that can be heard by others. In one example the acoustic transducer produces sound pressure in front and back acoustic cavities of the acoustic module, and the first sound-emitting opening is fluidly coupled to the front acoustic cavity and the second sound-emitting opening is fluidly coupled to the back acoustic cavity.

In some examples the second portion of the body includes a battery housing that is configured to house a battery power source for the open-ear headphone. There can be a printed circuit board in the first portion of the body and that is electrically coupled to the battery, and a flexible circuit element that electrically couples the printed circuit board to the acoustic transducer. In some examples the open-ear headphone also includes a pair of microphones in the first portion of the body. These microphones can be located in opposed sides of the first portion of the body such that one microphone is configured to be farther from the user's mouth than is the second microphone. The microphones can be arrayed, such as by beam-steering, to improve the pickup of the user's voice in the presence of noise or other external sounds.

FIGS. 1A-1I illustrate an exemplary open-ear headphone 10. Open-ear headphone 10 includes acoustic module 12 that is sized, shaped, and located relative to the open-ear headphone body 14 such that the acoustic module 12 is configured to be located in the concha of the outer ear of the user. Generally, the outer ear (also known as the auricle or pinna) of a human includes a concha that is immediately adjacent to the entrance to the ear canal, which is underneath (or, behind) the tragus. The concha is divided by the helix crus into a lower portion termed the cavum conchae and an upper portion termed the cymba conchae. The cavum conchae is a generally bowl-shaped feature that is directly adjacent to the ear canal. The cavum conchae typically includes a depression bordered by the anti-tragus, which is the lower part of the anti-helix and/or bordered by the lobule. The lobule (i.e., the earlobe), which is at the lower end of the helix, is typically just below the anti-tragus.

Figure 2:
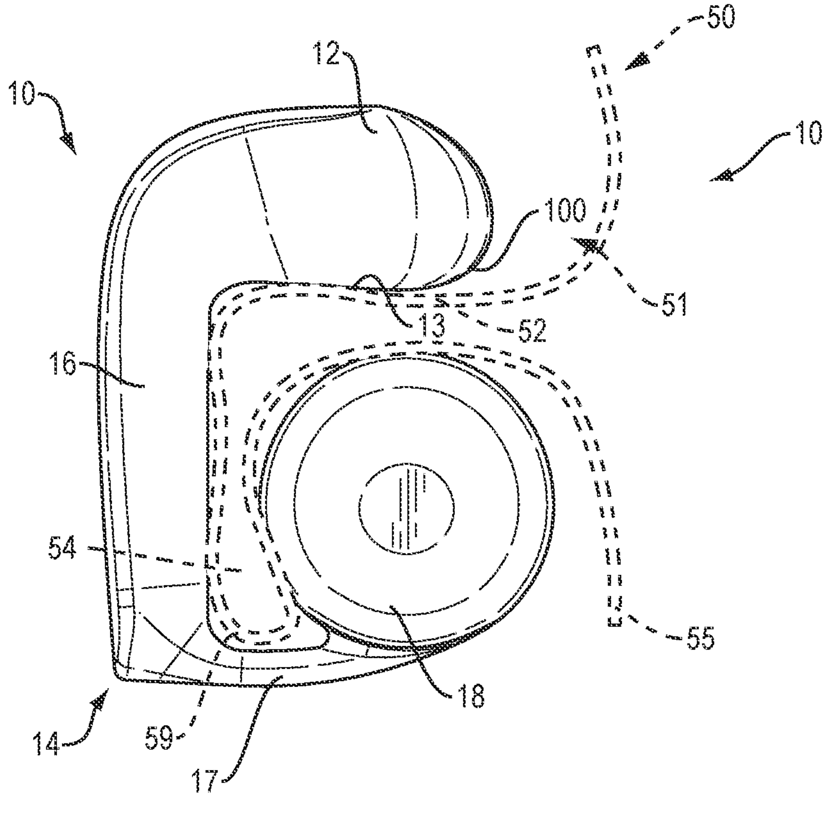
FIG. 2 illustrates how the open-ear headphone of FIGS. 1A-1G interfaces with the outer ear.

Open-ear headphone 10 body 14 is coupled to acoustic module 12 and includes a first portion 16 that is configured to pass over the outer side of the ear (e.g., at least one of the anti-helix and helix and lobule of the outer ear), and a second portion 18 that is configured to be located behind the outer ear. Body 14 is generally "L"-shaped from the side (as shown in FIG. 2) with portion 16 running at about a right angle to acoustic module 12, connecting portion 17 running at about a right angle to portion 16 and leading to distal portion 18. In an example portion 18 can be generally cylindrical such that it is configured to hold a generally cylindrical battery power source (e.g., a rechargeable battery). Overall, open-ear headphone 10 is generally "C"-shaped, as shown in FIG. 2. In an example acoustic module 12 and body 14 are parts of a unitary molded plastic housing that is constructed and arranged to contain the transducer, the battery, and any necessary electronics for operation of the headphone.

FIG. 2 illustrates how the open-ear headphone of FIGS. 1A-1I interfaces with the outer ear. As shown in FIG. 2, acoustic module 12 sits in the cavum conchae 51 of outer ear 50. As explained in more detail elsewhere herein, there is a first sound-emitting opening 100 that emits sound produced by an acoustic transducer in acoustic module 12. Sound-emitting opening 100 is spaced from and proximate the user's ear canal opening (not shown). In this example acoustic module 12 has lower portion 13 that is outwardly convex and is configured to sit in lower concavity 52 of cavum conchae 51. The weight of the open-ear headphone thus hangs from and is suspended from the cavum conchae; this holds the open-ear headphone on the ear without the need for it to clamp to the ear. To add compliance to lower portion 13 such that it sits on the uneven surface of concavity 52, there may be a cushion or other compliant or compressible member (not shown) on all or part of lower portion 13, or lower portion 13 can be made from a compliant material such as a foam. If light clamping of the open-ear headphone to the ear is desirable, compliance can be built in. For example, at least portion 17 could be made of an elastomer or include a hinge element so that it can flex relative to portion 16, thus altering the location of portion 18 and altering the thickness of the gap between portions 16 and 17 that encompass ear portion 54. A suitable compliant elastomer may have a hardness of 80 durometer shore A.

The open-ear headphone is configured such that when the acoustic module is placed into the cavum conchae of the ear the body passes over at least one of the antihelix, the helix, and the lobule of the ear, any one or more of these portions of ear 50 designated generally as 54 in FIG. 2. The user is able to pivot the body to a comfortable or otherwise desirable position of the body on the outer ear. See FIG. 3A for a more complete description of the outer ear and the manner in which body portion 16 overlies the outer ear. Second body portion 18 is behind the outer ear. In other words, it is located between outer ear 50 and the adjacent portion of head 55, as shown in FIG. 2. Portion 17 connects portions 16 and 18 and is configured to pass over edge 59 of outer ear 50.

Figure 3A:
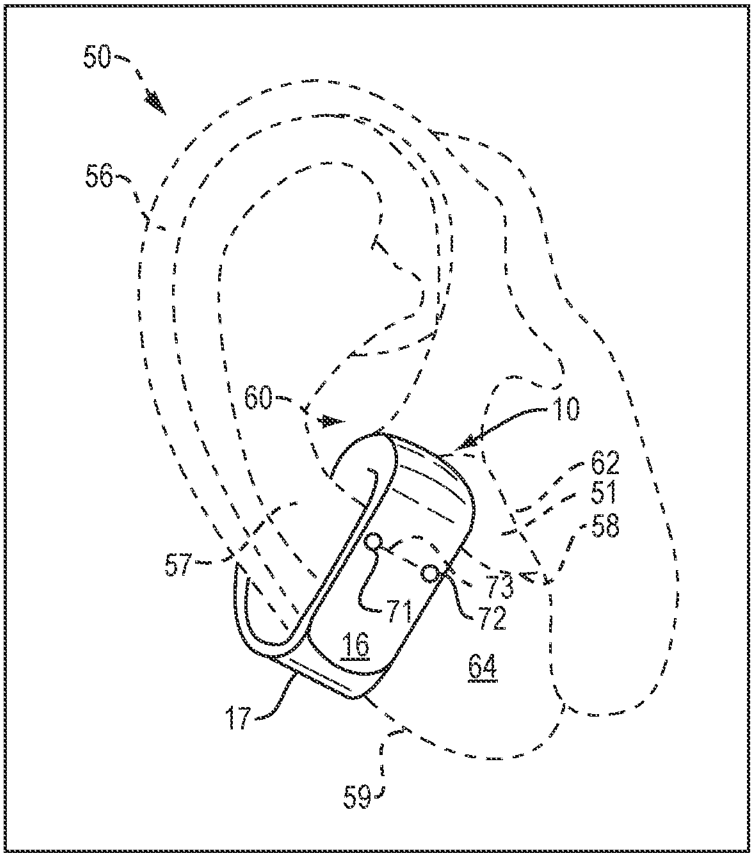
FIGS. 3A and 3B are side and rear perspective views, respectively, of the open-ear headphone in place on an ear.
Figure 3B:
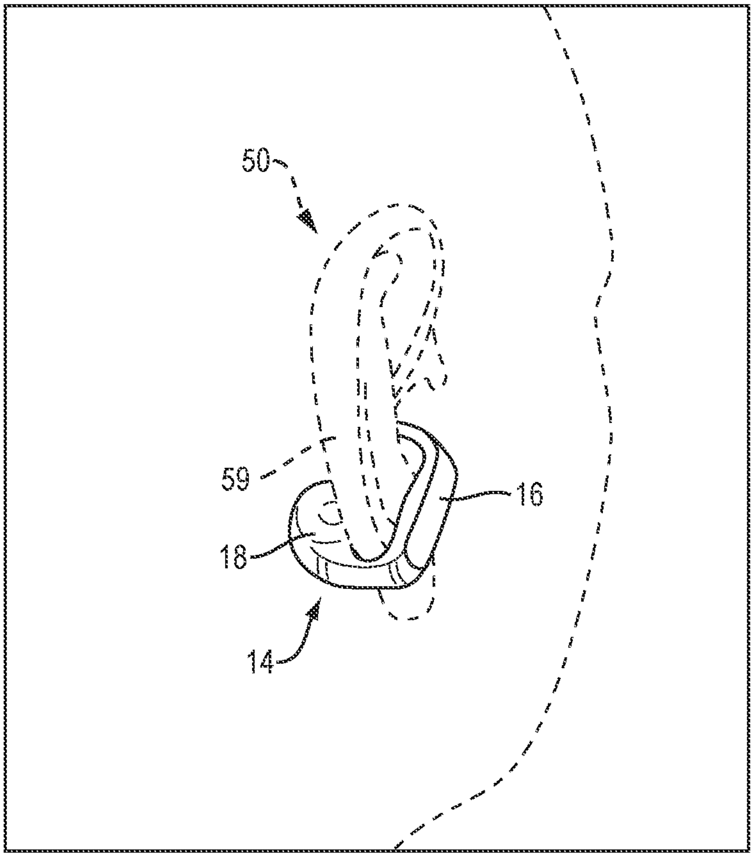

FIGS. 3A and 3B are side and rear perspective views, respectively, of the open-ear headphone 10 in place on outer ear 50. The manner in which open-ear headphone 10 interacts with outer ear 50 may be better understood with reference to parts of outer ear 50 illustrated in FIG. 3A. Outer ear 50 includes helix 56, anti-helix 57, lobule 64, tragus 62, and concha 60 that includes cavum conchae 51 with anti-tragus 58 forming the lower border of cavum conchae 51. Depending on the user's outer ear anatomy and the user's preference for the fit of the open-ear headphone, body portion 16 can be configured to pass over one or more of helix 56, anti-helix 57, lobule 64, and anti-tragus 58. Body portion 17 passes over the outer edge 59 of the ear at the location of one or more of helix 56, anti-helix 57, and lobule 64.

In some examples open-ear headphone 10 carries one or more external microphones. External microphones can be used to sense the user's voice and/or sense environmental sounds and/or as feed-forward microphones of an active noise cancelation system; these and other functions of external microphones of a headphone are known in the technical field and so are not further described herein. In this example, external microphones 71 and 72 are located in opposed sides of body portion 16 such that they lie generally along axis 73 that intersects or passes close to the expected location of the user's mouth. This way the microphones can be beam-formed if desired. Beamforming is also known in the technical field and so is not further described herein.

Figure 4:
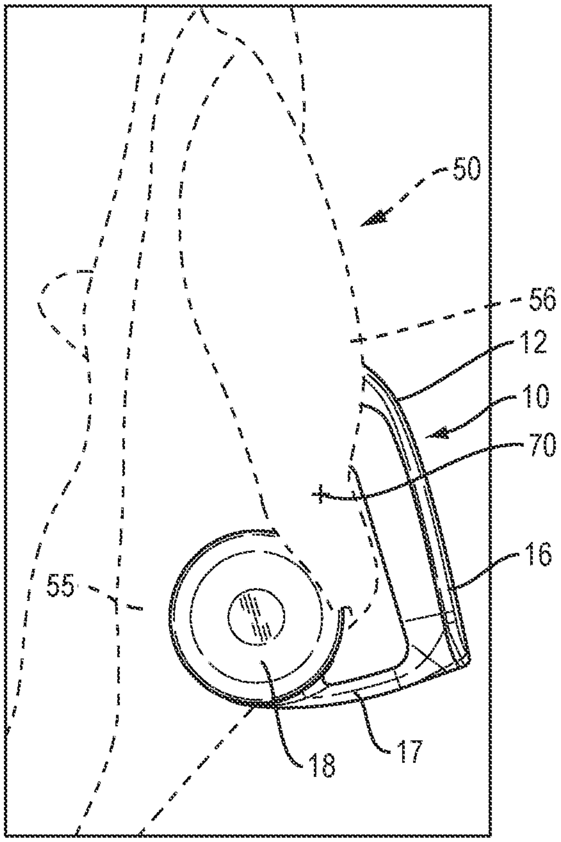
FIG. 4 is a rear view of the open-ear headphone in place on an ear, illustrating its center of gravity.

FIG. 4 is a rear view of the open-ear headphone 10 in place on outer ear 50, illustrating its center of gravity 70. The center of gravity is between acoustic module 12 (only partially visible in this view) and body portion 18. In some examples the center of gravity is in the outer ear, e.g., in the helix 56.

Figure 5:
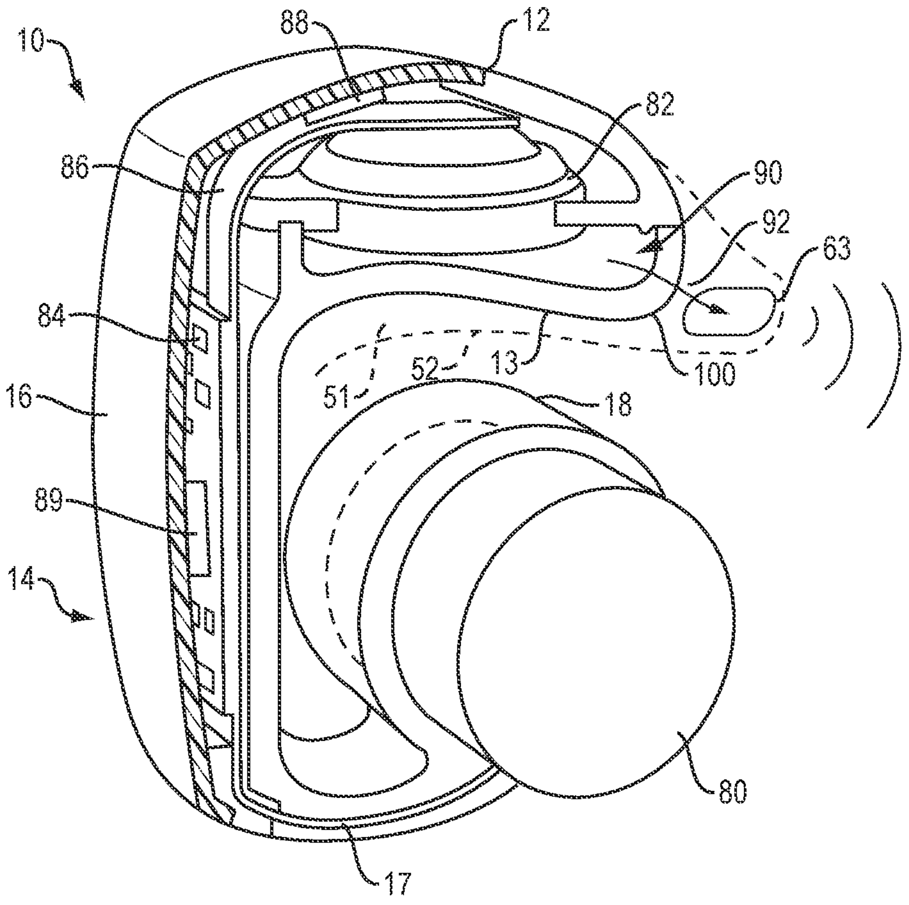
FIG. 5 is a schematic partial cross-sectional view of an open-ear headphone.

FIG. 5 is a schematic partial cross-sectional view of open-ear headphone 10 illustrating battery 80 carried inside of body portion 18. Acoustic module 12 carries acoustic transducer 82 that generates sound pressure in acoustic cavity 90. Sound-emitting opening 100 is in the end of acoustic module 12 that is closest to ear canal opening 63. Sound is emitted through opening 100, as indicated by arrow 92. Depending on the location of opening 100 and the specific configuration and the symmetry of acoustic module 12, open-ear headphone 10 may be able to be carried on either the left or the right ear. Alternatively, a set of headphones can include one left headphone and one right headphone, with configurations that are specific for the designated ear. Printed circuit board (PCB) 84 is located in body portion 16 and is electrically coupled to battery 80. Flex circuit element 86 leads from PCB 84 to transducer 82, to carry at least power and audio signals to the transducer. User interface elements can be built into the body portion if desired. For example, force touch elements (e.g., front to back or top to bottom squeezing) may be interpreted by a controller (not shown) to accomplish user interface elements of types known in the technical field. In some examples strain gauges are used for force touch sensing elements. In an example the strain gauges are mounted to the inside surface of headphone 10. Two possible locations are illustrated in FIG. 5, where strain gauge 88 is mounted in acoustic module 12 and strain gauge 89 is mounted in body portion 16.

Figure 6:
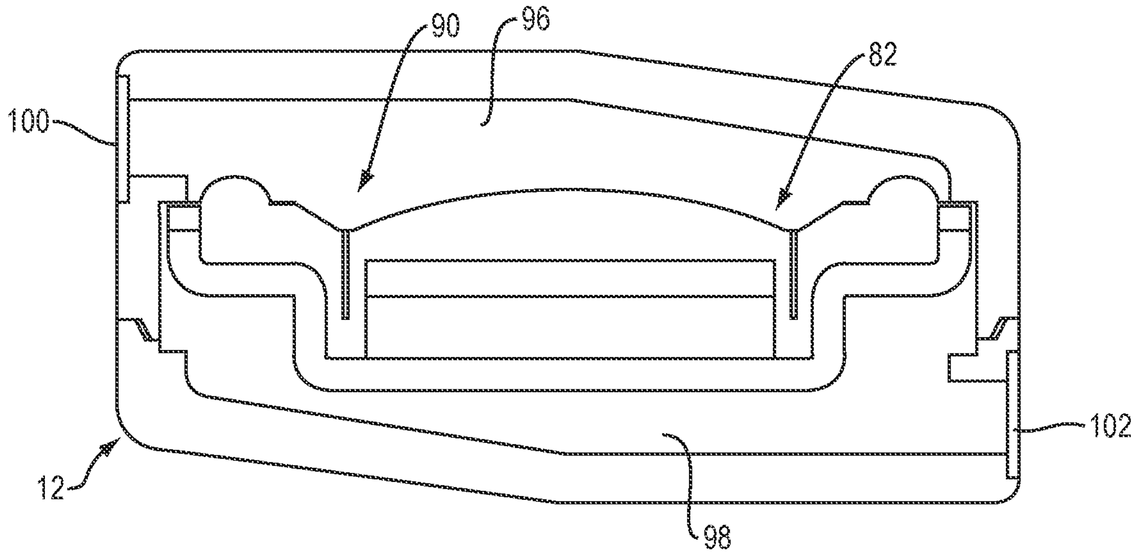
FIG. 6 is a schematic cross-sectional view of the acoustic module of an open-ear headphone.

FIG. 6 is a schematic cross-sectional view of the acoustic module 12 with transducer 82. In some examples the acoustic module includes a second sound-emitting opening 102 that is configured to be farther from the ear canal opening than is the first sound-emitting opening 100. The sound-emitting openings can be arranged to accomplish a dipole-like pattern that can result in sound cancelation that reduces spillage of the sound that can be heard by others. In one example the acoustic transducer produces sound pressure in front 96 and back 98 acoustic cavity portions of the acoustic cavity 90 of the acoustic module, and the first sound-emitting opening 100 is fluidly coupled to the front acoustic cavity 96 and the second sound-emitting opening 102 is fluidly coupled to the back acoustic cavity 98. As is known in the technical field, sound-emitting openings can be covered by resistive or environmentally-protective elements such as cloths or weaves.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An open-ear headphone, comprising:

an acoustic module configured to be located at least in part in a cavum conchae of an outer ear of a user and comprising: a portion that is configured to sit in a lower portion of the cavum conchae, an acoustic transducer, and a first sound-emitting opening that is configured to emit sound produced by the acoustic transducer;

a battery housing configured to be located behind the outer ear and containing a battery power source; and a compliant connecting portion coupling the battery housing to the acoustic module that enables displacement of the battery housing relative to the acoustic module.

2. The open-ear headphone of claim 1, wherein the first sound-emitting opening is configured to be spaced from and proximate a user's ear canal opening.

3. The open-ear headphone of claim 1, further comprising a body coupled to the acoustic module and comprising a first portion configured to pass over an outer side of at least one of an anti-helix and a helix and a lobule of the outer ear, the connecting portion, and a second portion comprising the battery housing.

4. The open-ear headphone of claim 3, wherein the body is generally “L”-shaped.

5. The open-ear headphone of claim 4, the acoustic module and body together are generally “C”-shaped.

6. The open-ear headphone of claim 3, wherein the first portion of the body is arranged at about a right angle to the acoustic module and the connecting portion is arranged at about a right angle to the first portion of the body.

7. The open-ear headphone of claim 3, wherein the connecting portion is disposed between the first portion of the body and the battery housing.

8. The open-ear headphone of claim 3, wherein the acoustic module and the body are parts of a unitary molded plastic housing.

9. The open-ear headphone of claim 1, wherein the acoustic module has lower portion that is outwardly convex and is configured to sit in a lower concavity of a user's cavum conchae.

10. The open-ear headphone of claim 1, further comprising a compliant member on at least part of the lower portion of the acoustic module.

11. The open-ear headphone of claim 1, wherein the connecting portion is formed of an elastomer.

12. The open-ear headphone of claim 11, wherein the elastomer has a hardness of 80 shore A.

13. The open-ear headphone of claim 1, further comprising one or more external microphones.

14. The open-ear headphone of claim 13, wherein the one or more microphones are configured to sense a user's voice and/or sense environmental sounds.

15. The open-ear headphone of claim 13, wherein the one or more microphones are configured as feed-forward microphones of an active noise cancelation system.

16. The open-ear headphone of claim 13, wherein the one or more microphones comprise a plurality of microphones which are beam-formed.

17. The open-ear headphone of claim 3, wherein a center of gravity of the open-ear headphone is between the acoustic module and the body.

18. The open-ear headphone of claim 17, wherein the center of gravity is configured to lie within the outer ear when the open-ear headphone is worn.

19. The open-ear headphone of claim 3, wherein a center of gravity of the open-ear headphone is between the acoustic module and the body.

20. The open-ear headphone of claim 3, further comprising a printed circuit board in the first portion of the body and that is electrically coupled to the battery.

21. The open-ear headphone of claim 20, further comprising a flexible circuit element that electrically couples the printed circuit board to the acoustic transducer.

22. The open-ear headphone of claim 3, wherein the connecting portion connects the first portion of the body to the second portion of the body and is configured to pass over an outer edge of a user's outer ear at a location of one or more of a helix, an anti-helix, and a lobule.

23. The open-ear headphone of claim 3, further comprising a user interface element built into the body.

24. The open-ear headphone of claim 2, wherein the acoustic module further comprises a second sound-emitting opening that is configured to be farther from the user's ear canal opening than is the first sound-emitting opening.

25. The open-ear headphone of claim 24, wherein the first and second sound-emitting openings are arranged to accomplish a dipole-like acoustic pattern.

* * * * *